(12) United States Patent
Zhang et al.

(10) Patent No.: US 10,049,172 B2
(45) Date of Patent: Aug. 14, 2018

(54) PREDICTING AND MODELING CHANGES IN CAPILLARY PRESSURE AND RELATIVE PERMEABILITIES IN A POROUS MEDIUM DUE TO MINERAL PRECIPITATION AND DISSOLUTION

(71) Applicant: Saudi Arabian Oil Company, Dhahran (SA)

(72) Inventors: Shuo Zhang, Houston, TX (US); Huihai Liu, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 326 days.

(21) Appl. No.: 14/964,734

(22) Filed: Dec. 10, 2015

(65) Prior Publication Data

US 2017/0169139 A1    Jun. 15, 2017

(51) Int. Cl.
*G06F 17/50* (2006.01)
*G01V 99/00* (2009.01)

(52) U.S. Cl.
CPC ........ *G06F 17/5009* (2013.01); *G01V 99/005* (2013.01)

(58) Field of Classification Search
CPC ........................ G06F 17/5009; G01V 99/005
See application file for complete search history.

(56) References Cited

U.S. PATENT DOCUMENTS

| | | | |
|---|---|---|---|
| 4,644,283 A | 2/1987 | Vinegar et al. | |
| 4,648,261 A | 3/1987 | Thompson et al. | |
| 4,743,854 A | 5/1988 | Vinegar et al. | |
| 4,893,504 A | 1/1990 | O'Meara, Jr. et al. | |
| 5,663,499 A | 9/1997 | Semmelbeck et al. | |
| 5,828,981 A | 10/1998 | Callender et al. | |
| 6,008,645 A | 12/1999 | Bowers et al. | |
| 6,021,662 A | 2/2000 | Moulu et al. | |
| 6,484,102 B1 | 11/2002 | Holmes | |
| 6,792,354 B1 | 9/2004 | O'Meara, Jr. | |
| 7,054,749 B1 | 5/2006 | O'Meara, Jr. | |
| 7,072,809 B2 | 7/2006 | Egermann et al. | |

(Continued)

OTHER PUBLICATIONS

Genuchten, "A Closed-form Equation for Predicting the Hydraulic Conductivity of Unsaturated Soils", Soil Science Society of America Journal, 1980, pp. 892-898, vol. 44, No. 5, Soil Science Society of America Journal.

(Continued)

*Primary Examiner* — Nicholas Tobergte
(74) *Attorney, Agent, or Firm* — Bracewell LLP; Constance G. Rhebergen; Albert B. Kimball, Jr.

(57) ABSTRACT

Changes in capillary pressure and relative permeabilities in reactive transport codes or reservoir simulators are formed by computer modeling. Based on continuum-scale hydraulic properties, the pore size distribution (PSD) is determined from a capillary pressure curve using the capillary tube concept. Changes in mineral volume through equilibrium or kinetic mineral reactions are then translated to changes in pore radii of the pore size distribution by selectively changing the radii of water occupied pores. The resulting new pore size distribution is converted back to an updated capillary pressure curve, which is then used for determining and forming models of total permeability and relative permeabilities at the continuum scale.

6 Claims, 8 Drawing Sheets

(56) References Cited

U.S. PATENT DOCUMENTS

| | | |
|---|---|---|
| 7,257,490 B2 | 8/2007 | Georgi et al. |
| 7,333,892 B2 | 2/2008 | Egermann et al. |
| 7,356,413 B2 | 4/2008 | Georgi et al. |
| 7,363,161 B2 | 4/2008 | Georgi et al. |
| 7,567,079 B2 | 7/2009 | Chen et al. |
| 7,716,028 B2 | 5/2010 | Montaron et al. |
| 7,765,091 B2 | 7/2010 | Lee et al. |
| 7,825,659 B2 | 11/2010 | Georgi et al. |
| 8,195,399 B2 | 6/2012 | Gladkikh et al. |
| 8,909,508 B2 | 12/2014 | Hurley et al. |
| 9,081,117 B2 | 7/2015 | Wu et al. |
| 9,134,457 B2 | 9/2015 | Hurley et al. |
| 2002/0173915 A1 | 11/2002 | Egermann et al. |
| 2006/0047432 A1 | 3/2006 | Egermann et al. |
| 2006/0273788 A1 | 12/2006 | Georgi et al. |
| 2006/0276969 A1 | 12/2006 | Georgi et al. |
| 2006/0287201 A1 | 12/2006 | Georgi et al. |
| 2007/0276639 A1 | 11/2007 | Montaron et al. |
| 2008/0120034 A1 | 5/2008 | Georgi et al. |
| 2008/0208539 A1 | 8/2008 | Lee et al. |
| 2008/0221800 A1 | 9/2008 | Gladkikh et al. |
| 2008/0303520 A1 | 12/2008 | Chen et al. |
| 2010/0076738 A1 | 3/2010 | Dean et al. |
| 2010/0114506 A1 | 5/2010 | Hustad |
| 2011/0082678 A1* | 4/2011 | Algive .............. G06F 17/5018 703/12 |
| 2012/0065888 A1 | 3/2012 | Wu et al. |
| 2012/0221306 A1 | 8/2012 | Hurley et al. |
| 2012/0232859 A1 | 9/2012 | Pomerantz et al. |
| 2012/0275658 A1 | 11/2012 | Hurley et al. |
| 2013/0231907 A1 | 9/2013 | Yang et al. |
| 2014/0214379 A1 | 7/2014 | Bethke et al. |
| 2014/0350860 A1 | 11/2014 | Mezghani et al. |
| 2015/0039275 A1 | 2/2015 | Mikhailov et al. |

OTHER PUBLICATIONS

Liu et al., "A permeability-change relationship in the dryout zone for CO2 injection into saline aquifers", international Journal of Greenhouse Gas Control, 2013, pp. 42-47, vol. 15, Elsevier.

Yechezkel, "A New Model for Predicting the Hydraulic Conductivity of Unsaturated Porous Media", Water Resources Research, 1976, pp. 513-522, vol. 12, No. 3, The American Geophysical Union.

International Search Report and Written Opinion for related PCT application PCT/US2016/065818 dated Mar. 9, 2017.

Miri et al., "New insights on the physics of salt preciptitation during injection of CO2 into saline aquifers", International Journal of Greenhouse Gas Control, 2015, pp. 10-21, vol. 43, Elsevier.

\* cited by examiner

PREDICTING AND MODELING CHANGES IN CAPILLARY PRESSURE AND RELATIVE PERMEABILITIES IN A POROUS MEDIUM DUE TO MINERAL PRECIPITATION AND DISSOLUTION

BACKGROUND OF THE INVENTION

1. Field of the Invention

The present invention relates to predicting and modeling changes in capillary pressure and relative permeabilities in a porous medium due to mineral precipitation and dissolution for reservoir simulators or reactive transport codes.

2. Description of the Related Art

In the oil and gas industries, massive amounts of data are required to be processed for computerized simulation, modeling and analysis for exploration and production purposes. For example, the development of underground hydrocarbon reservoirs typically includes development and analysis of computer simulation models of the reservoir, as well as reactive transport models of the reservoir. These underground hydrocarbon reservoirs are typically complex rock formations which contain both a petroleum fluid mixture and water. The reservoir fluid content usually exists in two or more fluid phases. The petroleum phase in reservoir fluids is produced by wells drilled into and completed in these rock formations. The water phase of the reservoir fluid over time changes both the capillary pressure and relative permeabilities of the formation rock.

A geologically realistic model of the reservoir, and the presence of its fluids, also helps in forecasting the optimal future oil and gas recovery from hydrocarbon reservoirs. Oil and gas companies have come to depend on geological models as an important tool to enhance the ability to exploit a petroleum reserve. Thus, it is important that the models formed in reservoir simulation and reactive transport models accurately represent petrophysical parameters of the reservoir over times of interest.

Mineral dissolution and precipitation reactions in subsurface porous media can alter the structure of the pore network and thus significantly impact porosity, permeability, capillary pressure, and relative permeabilities. These effects should be accurately captured in modeling reactive transport (coupled fluid flow and chemical reaction) in reservoirs so that the modeling is more indicative of the fluid content of the reservoir and its movement over times of interest.

Traditionally, reaction-induced changes in permeability have been estimated using empirical relationships, such as the Kozeny-Carmen equation. Relative permeabilities are assumed to be unchanged after mineral precipitation or dissolution, while changes in capillary pressure is approximated by using a Leverett scaling relation. This treatment, however, assumed that mineral dissolution and precipitation reactions occurred in all the pores. So far as is known, the prior art ignored the important fact that for multiphase flow, these reactions actually occur in pores occupied by the water phase of the multiphase flow. As a result, these traditional approaches are applicable to single-phase flow condition only, while multiphase flow occurs very often in oil and gas reservoirs.

Although some have taken into consideration that chemical reactions happen in the aqueous phase when dealing with a permeability change, practical approaches to accurately estimate effects of mineral dissolution and precipitation reactions on multiphase flow properties are not yet, so far as is known, available.

In Mezghani, (U.S. Published Application No. 2014/0350860) determining capillary pressure in a basin/reservoir is disclosed. Well log data is obtained that includes permeability log data, porosity log data, water saturation log data, and oil saturation log data. A processing methodology is described to obtain the capillary pressure of the reservoir or basin. Measures known as Thomeer parameters for a multipore system of a Thomeer model are determined by evaluating an objective function that measures the mismatch between the well log data and modeled data having the Thomeer parameters as input. The objective function is iteratively evaluated using linear equality constraints, linear inequality constraints, and nonlinear equality constraints until convergence criteria are met. The effects of mineral dissolution and precipitation reactions on multiphase flow properties are not taken into account.

Chen (U.S. Pat. No. 7,567,079) relates to determining capillary pressure and relative permeability. However, the determination is in connection with core plugs taken from formations, rather than in connection with reservoir simulation or reactive transport codes. Montaron (U.S. Pat. No. 7,716,028) discloses a system which uses a wettability logging tool to obtain data for generation of a three dimensional wettability map in connection with modeling a reservoir. O'Meara (U.S. Pat. No. 7,054,749) deals with determining reservoir parameters such as fluid volumes, fluid contacts and permeability in geological subsurface models. Georgi (U.S. Pat. No. 7,825,659) shows techniques for adjusting grain size of pore-scale geometric models of an earth formation by matching nuclear magnetic resonance (NMR) distribution from the model to measured NMR distribution data obtained from NMR well logs such as shown in FIGS. 1 and 2 of the drawings. Hustad (U.S. Published Application 2010/0114506) involves determining capillary pressures in a multi-phase fluid reservoir. However, in each of the foregoing references as in the Mezghani reference, the effects of mineral dissolution and precipitation reactions on multiphase flow properties are not taken into account.

SUMMARY OF THE INVENTION

Briefly, the present invention provides a new and improved computer implemented method of determining a model of capillary pressure and relative permeability changes in formation rock of a subsurface earth formation during reservoir simulation by a computerized reservoir simulator, the capillary pressure and relative permeability changes being due to mineral reactions of the formation rock as a result of fluid flow in the formation, the model being based on measures of initial capillary pressure and relative permeability of the formation rock. The method computer implemented forms a measure of initial pore size distribution and pore volume of the formation rock based on the measures of initial capillary pressure and relative permeability of the formation rock. Water saturation measures of the formation rock determined in the reservoir simulation are monitored for a water saturation value $S_p$ at which mineral reactions occur in the formation rock. A ratio is determined of pore volume after mineral reactions occur to the initial pore size volume of the formation rock, and a modified measure of rock permeability after mineral reactions of the formation rock is determined. A modified measure of capillary pressure and relative permeabilities of the formation rock after mineral reactions of the formation rock is also determined. The determined modified measures of rock permeability, capillary pressure and relative permeabilities are transferred to the reservoir simulator.

The present invention also provides a new and improved data processing system determining a model of capillary pressure and relative permeability changes in formation rock of a subsurface earth formation during reservoir simulation by a computerized reservoir simulator, the capillary pressure and relative permeability changes being due to mineral reactions of the formation rock as a result of fluid flow in the formation, the model being based on measures of initial capillary pressure and relative permeability of the formation rock at a time step during the reservoir simulation. The data proceeding system includes a memory storing the measures of initial capillary pressure and relative permeability of the formation rock. The data processing system also includes a processor which forms a measure of initial pore size distribution and pore volume of the formation rock based on the measures of initial capillary pressure and relative permeability of the formation rock, and monitors water saturation measures of the formation rock determined in the reservoir simulation for a water saturation value $S_p$ at which mineral at which mineral reactions occur in the formation rock. The processor determines a ratio of pore volume after mineral reactions occur to the initial pore size volume of the formation rock, and determines a modified measure of rock permeability after mineral reactions of the formation rock. The processor also determines a modified measure of capillary pressure of the formation rock after mineral reactions of the formation rock. The processor transfers the determined modified measures of rock permeability and capillary pressure to the reservoir simulator.

The present invention further provides a new and improved data storage device having stored in a non-transitory computer readable medium computer operable instructions for causing a data processing system to determine a model of capillary pressure and relative permeability changes in formation rock of a subsurface earth formation during reservoir simulation by a computerized reservoir simulator, the capillary pressure and relative permeability changes being due to mineral reactions of the formation rock as a result of fluid flow in the formation, the model being based on measures of initial capillary pressure and relative permeability of the formation rock at a time step during the reservoir simulation, the instructions stored in the data storage device cause the data processing system to form a measure of initial pore size distribution and pore volume of the formation rock based on the measures of initial capillary pressure and relative permeability of the formation rock. The instructions also cause water saturation measures of the formation rock determined in the reservoir simulation to be monitored for a water saturation value $S_p$ at which mineral reactions occur in the formation rock. The instructions cause a ratio to be determined of pore volume after mineral reactions occur to the initial pore size volume of the formation rock, and a modified measure of rock permeability after mineral reactions of the formation rock is determined. A modified measure of capillary pressure of the formation rock after mineral reactions of the formation rock is also caused to be determined. The instructions cause the determined modified measures of rock permeability and capillary pressure to be transferred to the reservoir simulator.

BRIEF DESCRIPTION OF THE DRAWINGS

The application file contains at least one drawing executed in color. Copies of this patent application publication with color drawings will be provided by the Patent and Trademark Office upon request and payment of the necessary fee.

DETAILED DESCRIPTION OF THE PREFERRED EMBODIMENTS

Figure 1:
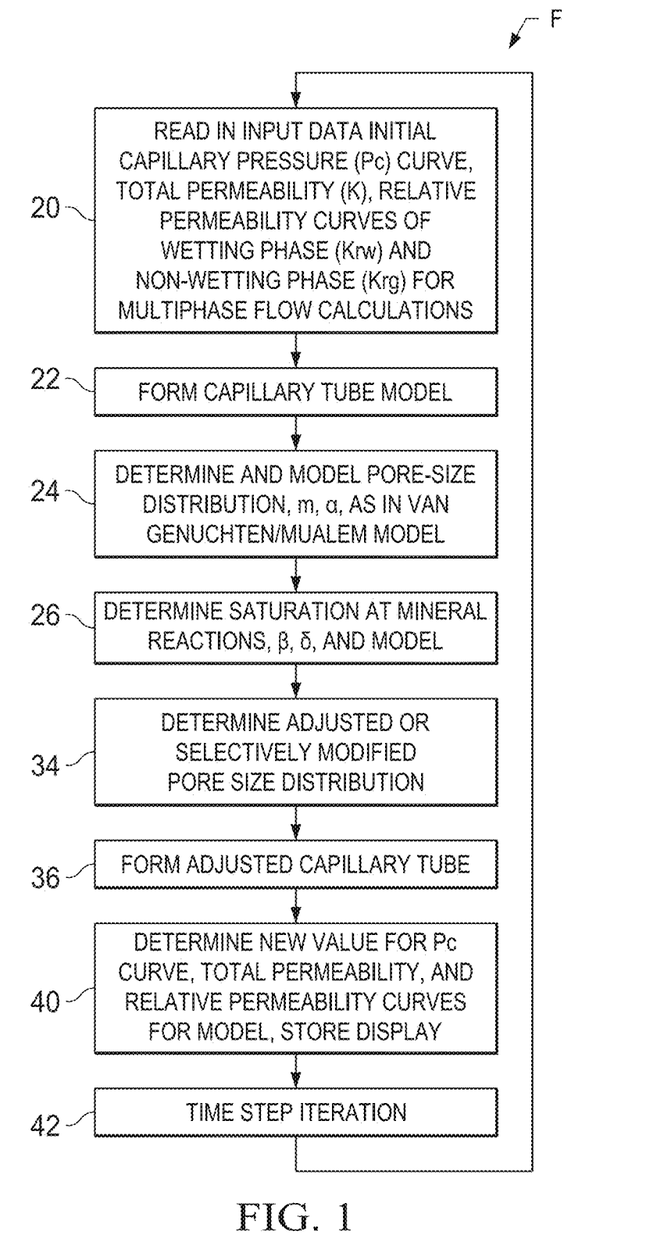
FIG. 1 is a functional block diagram of a set of data processing steps performed in a data processing system for determining modified capillary pressure and relative permeabilities due to mineral dissolution/precipitation according to the present invention.
Figure 4:
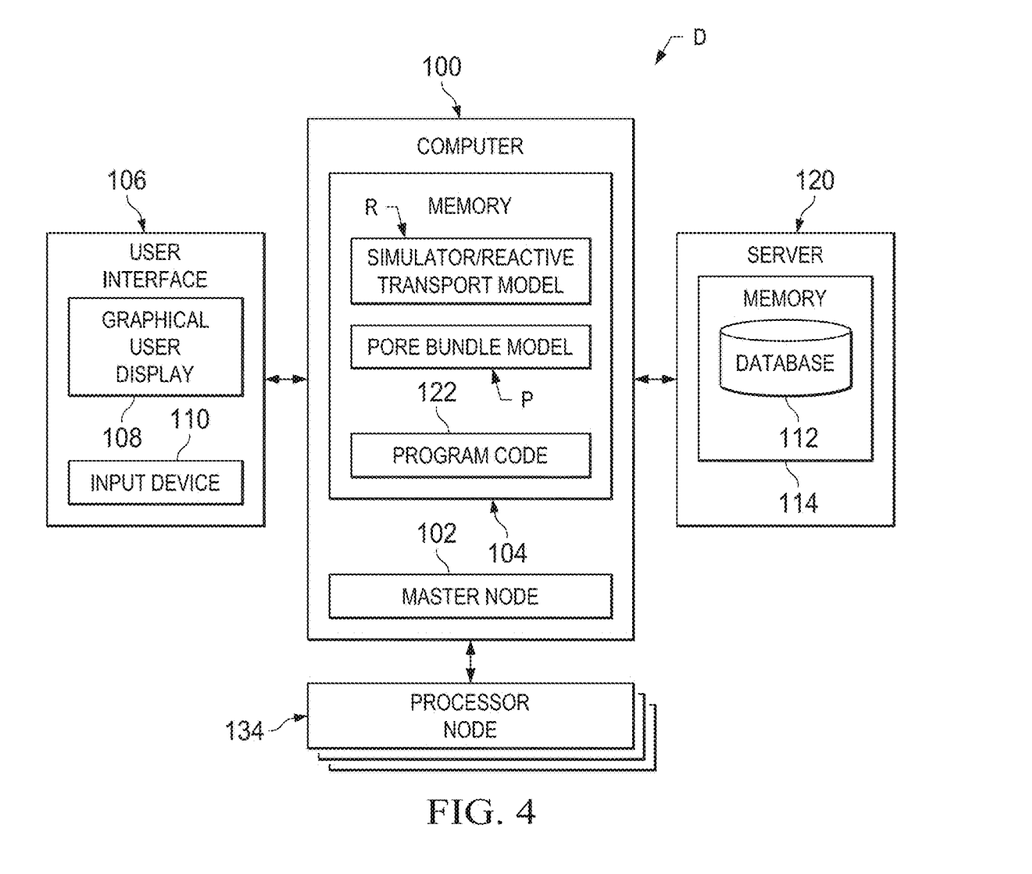
FIG. 4 is a schematic block diagram of a data processing system for determining modified capillary pressure and relative permeabilities due to mineral dissolution/precipitation according to the present invention.

In the drawings, a flowchart F (FIG. 1) indicates a basic computer processing sequence of the present invention for modeling changes in capillary pressure and relative permeabilities due to mineral reactions caused by fluids in a porous medium such as a formation rock from a reservoir of interest. The mineral reactions are in the form of precipitation and dissolution of the formation rock caused by the fluid, and the modeling of changes in capillary pressure and relative permeabilities according to the present invention is provided in conjunction with either a reservoir simulation or in connection with reactive transport modeling. The processing according to FIG. 1 is performed in a computer or data processing system D (FIG. 4).

Figure 2:
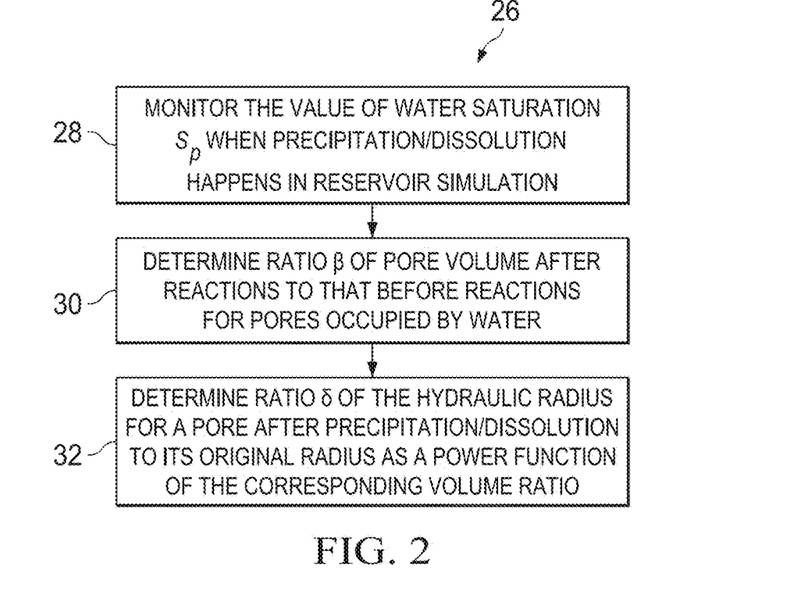
FIGS. 2 and 3 are functional block diagrams of more detailed processing steps of the computer implemented processing steps of FIG. 1.

The modeling of changes in capillary pressure and relative permeabilities may be performed in conjunction with a number of computer implemented reservoir simulators implemented in the data processing system D. A suitable simulator is shown schematically at R (FIG. 4). In FIG. 2, for example, is of the type described in SPE 51886 by A. H. Dogru, et al, "A Massively Parallel Reservoir Simulation for Large Scale Reservoir Simulation," SPE Reservoir Simulation Symposium, pp. 1-11, Houston, February '99.

Other reservoir simulators such as those known as POWERS and GigaPOWERS of the type described in the literature may also be used. See, for example articles by Dogru, A. H., et al.: "A Parallel Reservoir Simulator for Large-Scale Reservoir Simulation," SPE Reservoir Evaluation & Engineering Journal, pp. 11-23, 2002, by Dogru, A. H. et al., "A Next-Generation Parallel Reservoir Simulator for Giant Reservoirs," SPE 119272, proceedings of the 2009 SPE Reservoir Simulation Symposium, The Woodlands, Tex., USA, Feb. 2-4, 2009 and by Dogru, A. H., Fung, L. S., Middya, U., Al-Shaalan, T. M., Byer, T., Hoy, H., Hahn, W. A., Al-Zamel, N., Pita, J., Hemanthkumar, K., Mezghani, M., Al-Mana, A., Tan, J., Dreiman, T., Fugl, A, Al-Baiz, A., "New Frontiers in Large Scale Reservoir Simulation," SPE 142297, Proceedings of the 2011 SPE Reservoir Simulation Symposium, The Woodlands, Tex., USA, Feb. 21-23, 2011.

It should be understood that the present invention is also suitable for use with other reservoir simulators as well. As noted, the modeling of changes in capillary pressure and relative permeabilities may be performed in conjunction with a number of computer implemented reactive transport models implemented as also shown schematically at R (FIG. 4) in the data processing system D, such as Bethke, et al, (U.S. Published Application 2014/0214379), "System and Method for Reactive Transport Modeling". It should be understood that the present invention is also suitable for use with other reactive transport models, as well.

According to the present invention, a methodology illustrated schematically in the flow chart F of FIG. 1 is provided to determine and model changes in capillary pressure and relative permeabilities due to mineral reactions caused by fluids in connection with reactive transport modeling or reservoir simulations. With the present invention, and as described in detail below, starting with continuum-scale hydraulic properties obtained regarding the rock of interest, the pore size distribution (or PSD) is determined from a capillary pressure curve using a capillary tube model. Changes in mineral volume through equilibrium or kinetic mineral reactions are then translated to changes in pore radii of the pore size distribution by selectively changing the radii of water occupied pores of the capillary tubes. The resulting new pore size distribution is converted back to an updated capillary pressure curve, which is then used for determining measures of total permeability and relative permeabilities of the rock at the continuum scale. A Nomenclature in accordance with the present invention is set forth below identifying the physical measures on which determination of total permeability and relative permeabilities is based.

NOMENCLATURE

Set forth below for ease of reference and understanding is a listing of the nomenclature used in the Equations which express the physical relationships between the various parameters and measurements used in data processing steps and analysis according to the present invention:

h=capillary pressure head
m, n=empirical parameters in van Genuchten relation
K=permeability
$K_0$=initial permeability
$K_w$=water permeability
$K_{w0}$=initial water permeability
$K_g$=gas or oil permeability
$K_{g0}$=initial gas or oil permeability
$K_{rw}$=relative permeability of water
$K_{rg}$=relative permeability of gas or oil
$P_c$=capillary pressure
$S_p$=water saturation when mineral reactions occur
$S_w$=water saturation
Greek Variables:
α=empirical parameters in van Genuchten relation
β=ratio of new pore volume to initial pore volume
δ=ratio of new pore radius to initial pore radius
θ=water content Considering the methodology shown in the flow chart F more in detail, as indicated at step 20, input data required for processing according to the present invention are read into the data processing system D. Such data includes an initial capillary pressure ($P_c$) curve, a measure of total permeability (K), relative permeability curves of wetting phase ($K_{rw}$) and non-wetting phase ($K_{rg}$) used for multiphase flow calculations. The reservoir rock, capillary pressure curve and relative permeability curves input data read in and stored during step 20 are obtained by using either experimental or other conventional techniques, such as literature data, pore network modeling, or the like. The values so obtained are commonly used as inputs into multi-phase flow models.

During step 22, a capillary tube model is formed. The pore space of a porous medium so formed is conceptualized as cylindrical capillaries with a continuous distribution of radius. A given capillary can be either water filled or completely dry, depending on the saturation state of the medium. With this geometric idealization, the capillary pressure-water saturation curve can be interpreted to represent continuous cumulative pore-size distributions.

Next, in step 24, a value of an empirical parameter m used according to the present invention is determined. A suitable method of such determination is by computerized fitting the initial capillary curve stored as a result of step 20 to a function of water saturation S. A suitable such function of water saturation S is as follows:

$$S = [1 + (\alpha h)^n]^{-m} \qquad (1)$$

where S is water saturation; h is capillary pressure head; and each of α, n and m are empirical parameters. The parameters n and m are related, as $$m = 1 - \frac{1}{n}.$$

The fitting during step 24 may, for example, be according to the techniques described in "A Closed-Form Equation for Predicting the Hydraulic Conductivity of Unsaturated Soils", Soil Soc. Am. J., Vol. 44, p. 892-898, Van Genuchten (1980). Such a model is applicable for capillary pressure and relative permeability (before chemical reactions), however it should be understood that other models may also be used.

Step 26 is performed to determine measures relating to pore parameters before and after mineral reaction whether precipitation or dissolution. Details of step 26 are shown in more detail as steps 28, 30 and 32 in FIG. 2. The measures determined during step 26 include a ratio β which represents for pores occupied by water in the sample the ratio of pore volume after such mineral reactions to the pore volume before mineral reactions. The measures determined during step 26 also include a parameter δ representing the ratio of the hydraulic radius for a pore after mineral reaction to that before the reaction.

Step 28 (FIG. 2) involves monitoring the value determined during reservoir simulation/reactive transport modeling by the data processing system D of water saturation $S_p$ when precipitation/dissolution happens in the reservoir simulation/reactive transport modeling being performed in the data processing system D. It is to be noted that chemical reactions only modify the geometry of pores occupied by water which corresponds to $S<S_p$, which is defined as follows:

$$S_p = \frac{\theta_p - \theta_r}{\theta_s - \theta_r} \quad (2)$$

where θ is wetting-phase content (the ratio of wetting-phase volume to the corresponding bulk volume of a porous medium), p refers to the time when precipitation/dissolution stars to occur, and subscripts s and r refer to saturated and residual values for θ.

During step 30 (FIG. 2), the ratio β of pore volume after mineral reactions to the pore volume before mineral reactions for pores occupied by water (corresponding to $\theta_p$), is determined using:

$$\beta = \frac{\theta_p - \theta_{reaction}}{\theta_p} = 1 - \frac{\theta_{reaction}}{\theta_p} \quad (3)$$

In the foregoing processing during step 30, $\theta_{reaction}$ is positive for precipitation, negative for dissolution.

In step 32 (FIG. 2), the ratio δ of the hydraulic radius (for a pore after precipitation/dissolution) to its original radius is determined. The ratio δ is formed as a power function of the corresponding volume ratio β determined during step 30. Doing so accounts for the fact that the amount of mineral precipitation/dissolution within pores depends on the local pore volume, but assumes that within each pore, chemical reactions are uniform. The ratio δ is represented as follows:

$$\delta = \beta^\chi \quad (4)$$

where χ is an empirical parameter which is set equal to a suitable empirical value. A suitable such value according to the present invention is 4.5, based on "A permeability-change relationship in the dry out zone for $CO_2$ injection into saline aquifers", International Journal of Greenhouse Gas Control, (Liu et al., 2013).

After steps 28, 30 and 32 of step 26 are performed, selectively modified pore size distributions for the rock sample are determined during step 34 (FIG. 1). During step 34, the pore size distributions are adjusted according to the ratios β and δ as determined from processing according to step 26.

Step 36 involves forming an adjusted capillary tube model according to the techniques performed during step 22, but based on the adjusted or modified pore size distributions resulting from step 34.

Figure 3:
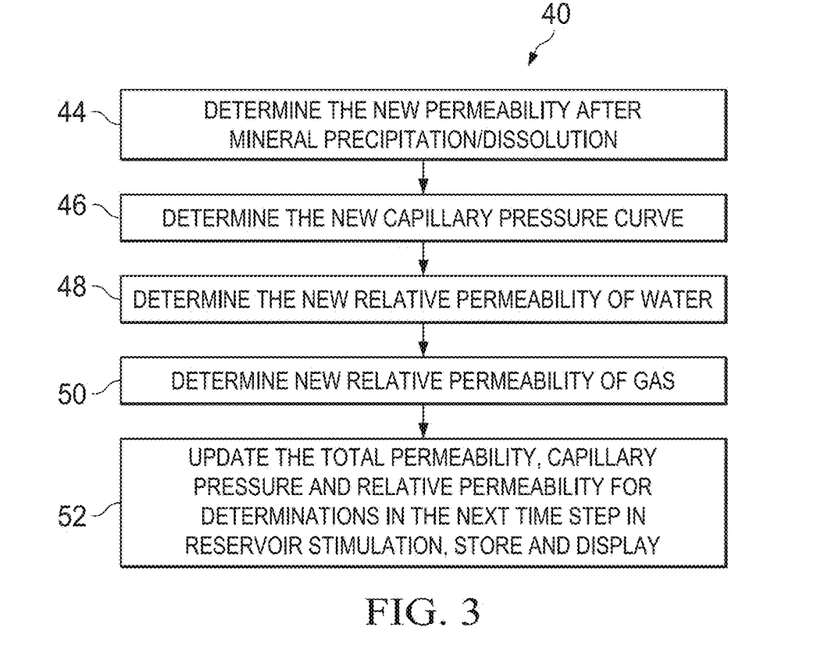

Step 40 follows step 36 and involves determination of new values for the pore sample of interest of new values for the measures of the formation rock model capillary pressure ($P_c$) curve, a measure of total permeability (K), and relative permeability curves for the model. The new values are then stored in the data processing system D for use in connection with the reservoir simulation/reactive transport modeling by the data processing system D. The new values are also available for display. Details of step 40 are shown in FIG. 3. After step 40, as indicated at 42, the processing time step corresponding to that of the reservoir simulator time or reactive transport model being performed in the data processing system D is incremented and processing returns to step 20 for a new iteration of processing at the incremented time step.

Considering the processing during step 40 more in detail (FIG. 3), a new value for the rock permeability after mineral precipitation/dissolution is determined during step 44 according to the following relation:

$$\frac{K}{K_0} = \zeta^{\frac{1}{2}} \left[ (\delta\beta - 1) \left\{ 1 - \left(1 - S_p^{\frac{1}{m}}\right)^m \right\} + 1 \right]^2 \quad (5)$$

where ζ, representing rock tortuosity is defined as $\zeta = 1 - S_p + \delta^2 S_p$.

During step 46, a new capillary pressure curve S is determined in the data processing system D. Processing during step 46 takes two forms depending on whether the mineral reaction takes the form of precipitation or, alternatively, dissolution. In the case of the mineral reaction being precipitation, the new capillary pressure curve S is determined during step 46 according to $$h = \frac{h_0}{\delta}, \text{ when } S \le S_p; \text{ or} \quad (6)$$

$$h = h_0, \text{ when } S > S_p$$

where $h_0$ is the initial capillary pressure at saturation S.

In the case of the mineral reaction being dissolution, processing during step 46 in the data processing system D first determines two threshold saturations $S_1$ and $S_2$ as follows:

$$S_1 = [1 + (\alpha h_p/\delta)^n]^{-m}$$

$$S_2 = [1 + (\alpha h_p \delta)^n]^{-m}$$

where $h_p = h_0(S_p)$.

The new capillary pressure curve determined during step 46 when the mineral reaction is dissolution is then as follows:

$$S = [1 + (\alpha h \delta)^n]^{-m}, \text{ when } 0 \le S < S_1$$

$$S = [1 + (\alpha h \delta)^n]^{-m} + [1 + (\alpha h)^n]^{-m} - S_p, \text{ when } S_1 \le S < S_2$$

$$S = [1 + (\alpha h)^n]^{-m}, \text{ when } S_2 \le S \le 1 \quad (7)$$

Next, processing during step 40 proceeds to step 48 in order to determine a new relative permeability of water according to the following relations based on water saturation S:

$$\frac{K_w}{K_0} = \delta^3 \beta^2 \frac{K_{w0}}{K_0}, \text{ when } S \le S_p \quad (8)$$

$$\frac{K_w}{K_0} = \left(\frac{S - S_p + \delta^2 S_p}{S}\right)^{1/2} \left[\frac{f(S) + (\delta\beta - 1)f(S_p)}{f(S)}\right]^2 \frac{K_{w0}}{K_0},$$

$$\text{when } S > S_p$$

where $f(S)=1-(1-S^{1/m})^m$ and $K_{w0}$ and $K_0$ are the initial water permeability and total permeability before mineral alteration.

Processing step 50 involves determining a new relative permeability of gas according to the following relations based on water saturation S:

$$\frac{K_g}{K_0} = \frac{K_{g0}}{K_0}, \text{ when } S > S_p \quad (9)$$

$$\frac{K_g}{K_0} = \left[\frac{(S_p - S)\delta^2 + (1 - S_p)}{1 - S}\right]^{1/2} \left[\frac{1 - \delta\beta f(S) + (\delta\beta - 1)f(Sp)}{1 - f(S)}\right]^2 \frac{K_g}{K_0},$$

when $S \leq S_p$ where $K_{g0}$ and $K_0$ are the initial gas permeability and total permeability before mineral alteration.

Step 52 is then performed by the data processing system D to update the total permeability, capillary pressure and relative permeability for use in connection with the reservoir simulation/reactive transport modeling by the data processing system D. Processing begins again at step 20 in the next time step in reservoir simulation after time step iteration during step 42 (FIG. 1).

As illustrated in FIG. 4, the data processing system D includes a computer 100 having a master node processor 102 and memory 104 coupled to the processor 102 to store operating instructions, control information and database records therein. The data processing system D is preferably a multicore processor with nodes such as those from Intel Corporation or Advanced Micro Devices (AMD), or an HPC Linux cluster computer. The data processing system D may also be a mainframe computer of any conventional type of suitable processing capacity such as those available from International Business Machines (IBM) of Armonk, N.Y. or other source. The data processing system D may in cases also be a computer of any conventional type of suitable processing capacity, such as a personal computer, laptop computer, or any other suitable processing apparatus. It should thus be understood that a number of commercially available data processing systems and types of computers may be used for this purpose.

The computer 100 is accessible to operators or users through user interface 106 and is available for displaying output data or records of processing results obtained according to the present invention with an output graphic user display 108. The output display 108 includes components such as a printer and an output display screen capable of providing printed output information or visible displays in the form of graphs, data sheets, graphical images, data plots and the like as output records or images.

The user interface 106 of computer 100 also includes a suitable user input device or input/output control unit 110 to provide a user access to control or access information and database records and operate the computer 100. Data processing system D further includes a database 112 of data stored in computer memory, which may be internal memory 104, or an external, networked, or non-networked memory as indicated at 116 in an associated database server 120.

The data processing system D includes program code 122 stored in non-transitory memory 104 of the computer 100. The program code 122 according to the present invention is in the form of computer operable instructions causing the data processor 102 to perform modeling of changes in capillary pressure and relative permeabilities in a porous medium due to mineral precipitation and dissolution in reservoir simulation according to the present invention in the manner that has been set forth.

The computer memory 104 also contains stored computer operating instructions in the non-transitory form of the pore network module P, the Reservoir Simulator/Reactive Transport Modeling Module R, and also the data from database 112 being manipulated and processed by the processor 102.

It should be noted that program code 122 may be in the form of microcode, programs, routines, or symbolic computer operable languages that provide a specific set of ordered operations that control the functioning of the data processing system D and direct its operation. The instructions of program code 122 may be stored in memory 104 of the data processing system D, or on computer diskette, magnetic tape, conventional hard disk drive, electronic read-only memory, optical storage device, or other appropriate data storage device having a computer usable non-transitory medium stored thereon. Program code 122 may also be contained on a data storage device such as server 120 as a non-transitory computer readable medium, as shown.

The data processing system D may be comprised of a single CPU, or a computer cluster as shown in FIG. 4, including computer memory and other hardware that makes it possible to manipulate data and obtain output data from input data. A cluster is a collection of computers, referred to as nodes, connected via a network. Usually a cluster has one or two head nodes or master nodes 102 that are used to synchronize the activities of the other nodes, referred to as processing nodes 134. The processing nodes 134 each execute the same computer program and work independently on different segments of the grid which represents the reservoir.

Pore Network Models

Figure 5:
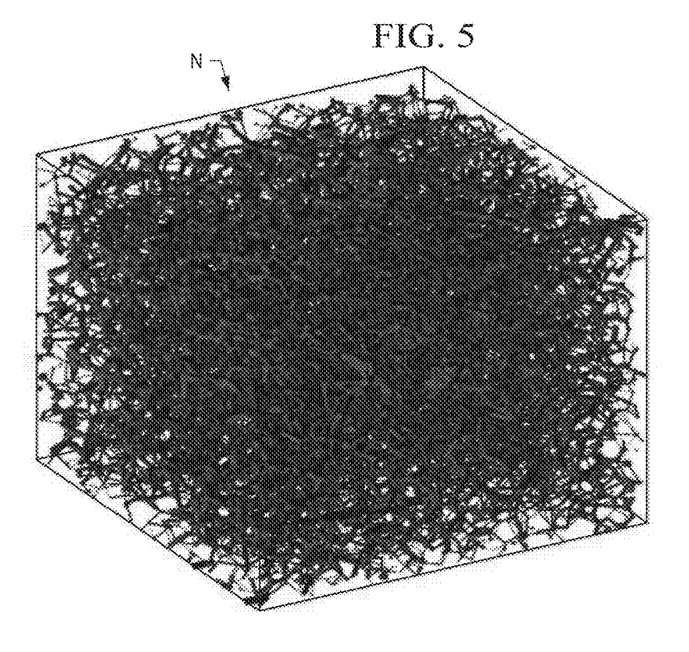
FIG. 5 is a model of phase distribution in a pore network model of a porous formation rock sample.

In order to test the methodology of the present invention for determining changes of capillary pressure and relative permeabilities due to mineral precipitation and dissolution, pore network models were formed and used to compute capillary pressure and relative permeabilities in an oil-water flow system. The pore network model took the form of a constrained set of parameters that mimic the wetting state of a reservoir which is being processed by reservoir simulation or reactive transport modeling. FIG. 5 is a display of a three-dimensional pore network model N of the type used according to the present invention and stored in the data processing system D, as described above.

The three-dimensional models so used are realistic 3D pore-networks extracted from pore-space reconstruction methods and from computerized tomographic (CT) images that are geometrically and topologically equivalent to the pore structures of a formation rock, in this case, Berea sandstone sample. The example network model N is composed of 12,349 pore bodies (or nodes) and 26,146 pore throats (or bonds). Each pore in the network model N is assigned a regular shape (triangle, star, or circle) based on the shape factor which best matches that of the real pore shape.

An example pore network N so formed by the pore network module P in the data processing system D is shown in FIG. 5. The pore network N of FIG. 5 has average coordination number of 4.19, initial permeability is 1639.47 mD, and the porosity is 24.02%. In the numerical experiment described below, the present invention started with a fully water-saturated network ($S_w$=100%). Then, as part of the numerical experiment, a condition of oil as part of the numerical experiment, a condition of being injected into the network for primary drainage was modeled in the pore network module P. The pore network module P of the data processing system D determines a capillary pressure curve and relative permeability curves as functions of water saturation through flooding. All floods are assumed to be capillary dominated and are simulated according to invasion-percolation principles. The pore network module P also outputs all nodes and bonds in order of capillary entry pressure, which is theoretically the order in which pores are invaded, as shown in FIG. 5 for $S_w$=50% (red is invaded oil, blue is water).

Figure 6:
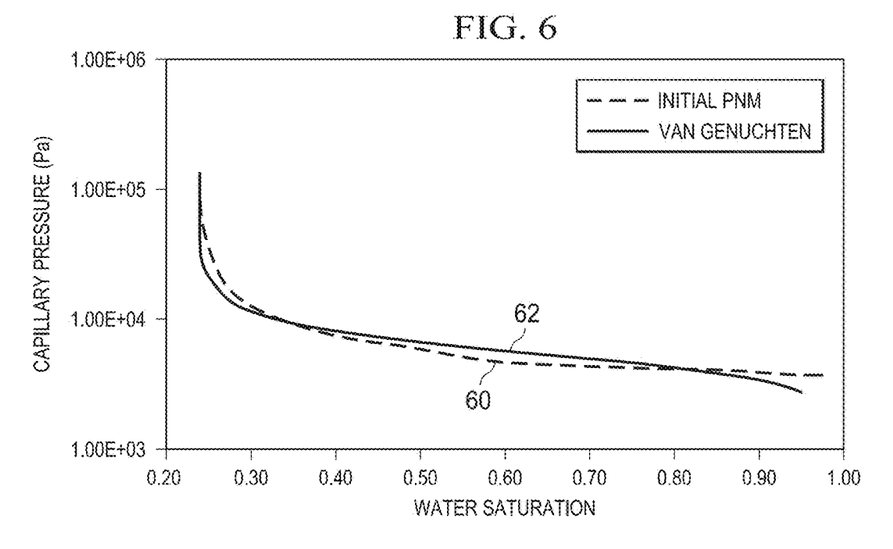
FIG. 6 is a plot of initial capillary pressure as a function of water saturation from a pore network model of a porous formation rock sample.
Figure 7:
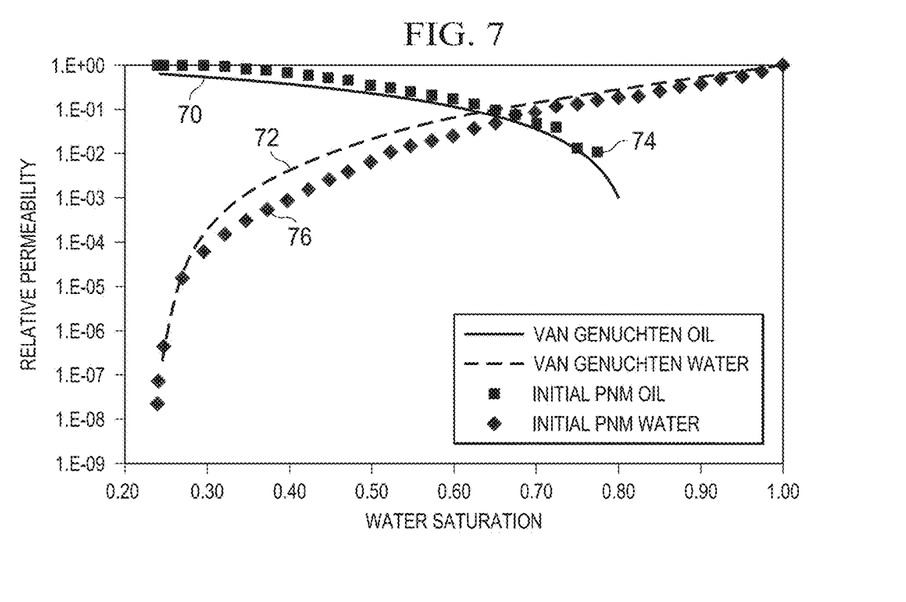
FIG. 7 is a plot of initial water permeability from a pore network model of a porous formation rock sample.

An initial capillary pressure curve as a function of water saturation 60 formed according to the numerical experiment described above and as initial capillary pressure curve 62 formed according to Van Genuchten are shown in FIG. 6 for the pore network model N. Relative permeability curves 70 for oil and 72 for water as functions of water saturation formed according to van Genuchten, and relative permeability curves 74 for oil and 76 for water according to the numerical experiment in the pore network module P are shown in FIG. 7. The parameters displayed in FIGS. 6 and 7 are determined by running a first flood of oil through an initially water-saturated sample. As can be determined in FIG. 6 and FIG. 7, the residual saturation of water is 24.0%; residual saturation of oil is 20.0%.

In order to determine a reasonable value for the parameter m, the data processing system D fits the capillary pressure curve in FIG. 6 using Equation (1) in the manner described above. Resulting parameters from fitting the capillary pressure curve in this manner are m=0.748, and α=0.0001994. To test this m value on the relative permeability curves, the present invention used the van Genuchten (1980) model described above and compared that value m with the relative permeabilities determined from pore network modeling, such as shown at 74 and 76 in FIG. 7. Results show that the van Genuchten model presents a satisfactory fit of initial relative permeabilities.

Next, as part of the numerical experiment, a condition of another first flood from initial water-saturated condition to a target water saturation of 50% was modeled in the pore network module P. The bonds and nodes that are filled with water were identified in the pore network model N when water saturation reaches $S_w$=50%. Subsequently, the radii of these bonds and nodes were modified by a factor of δ according to Equation (3) and (4).

Figure 8:
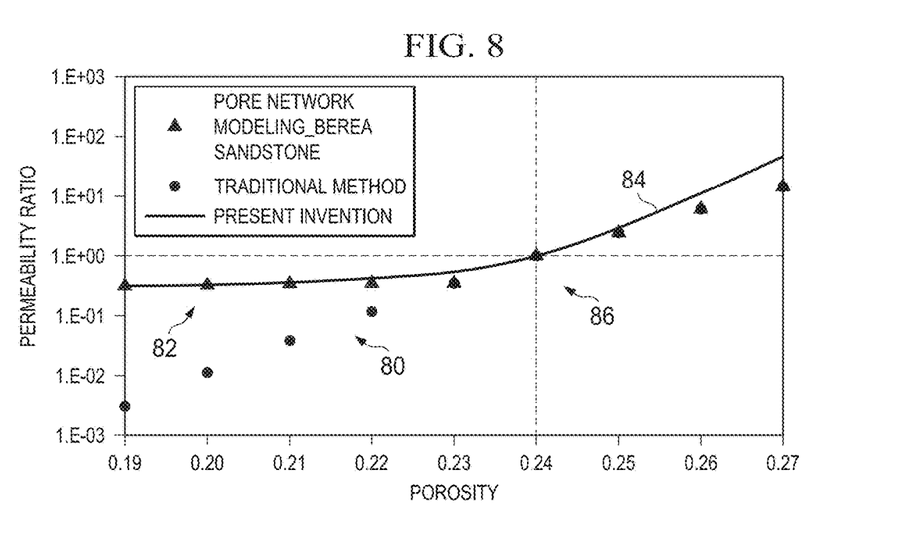
FIG. 8 is a comparative plot of simulated and predicted changes in permeability after mineral precipitation and dissolution of a porous formation rock sample obtained according to the present invention and the prior art methods for the same sample.

A second approach was also taken to modify the pore radii of all pores and throats in the pore network model N. A condition of the modified pore network models being flooded again with oil starting from 100% water saturation was modeled to determine a new capillary pressure curve and relative permeability curves. The indicated triangles and dots in plots of porosity as a function of permeability ratio of FIG. 8, are results from modified pore network models using the two approaches respectively. The difference can be seen to be substantial in the precipitation case, as indicated at 80.

In the traditional approach where precipitation happens in all pores and throats, permeability in the indicated region 80 of FIG. 8 can be seen to decrease up to 3 orders of magnitudes when porosity decreases from 24% to 19%. However, if precipitation is limited to only the water occupied pores and throats, only the radii of these small pores and throats are decreased, while the other pores and throats are kept unchanged. Thus, values of permeability plotted at 82 can be seen to converge to a value indicated at 84 which corresponds to that of the unchanged pores and throats, and does not decrease to an infinitesimally small value. The permeability change can be characterized into two regions, a transitional stage at 86 from 24% to 22% porosity, and a plateau as indicated at 82 where permeability is relative constant when porosity is smaller than 22%. Most of the permeability is contributed by the unchanged pores and throats on this plateau.

It was determined that a modified Liu et al. (2013) model of the type mentioned above captures this phenomenon adequately as shown by the solid line 84 in FIG. 8. This is referred to as modified in that the previous model only considered the change in hydraulic radius but did not consider the volume change of pores after mineral reactions. The traditional method (circular dots in FIG. 8) which assumes that all pores and throats are filled by precipitations fails to reflect such actual petrophysical conditions.

Figure 9:
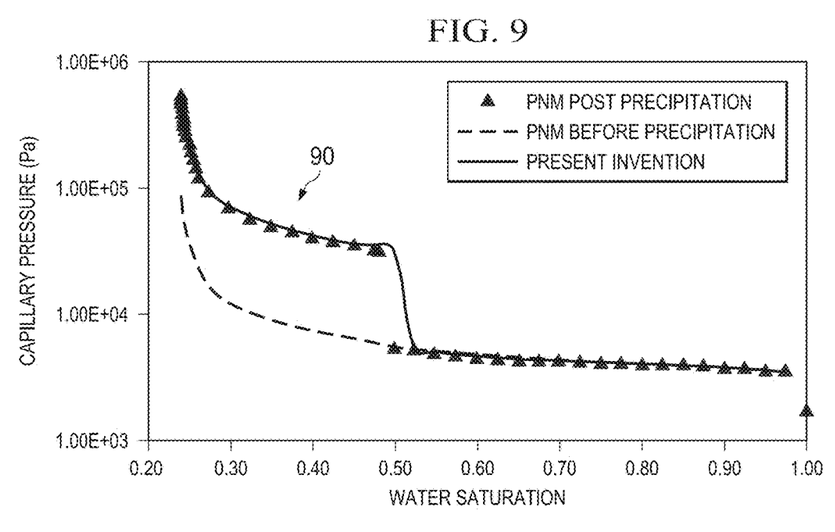
FIG. 9 is a comparative plot of change of capillary pressure before and after precipitation determined from a pore network modeling of a porous formation rock sample, and from the present invention for the same sample.

FIGS. 9 through 14 are plots of comparisons of pore network models before and after mineral reactions with results obtained according to the present invention. Two sets of calculations are conducted and compared, the first (FIGS. 9 through 11) decreasing porosity from 24% to 22%, which indicates precipitation, and the other increasing porosity (FIGS. 12 through 14) from 24% to 25%, which indicates dissolution. FIG. 9 is an example plot of capillary pressure ($P_a$) as a function of water saturation where precipitation is present. In FIG. 9, porosity decreases from 0.24 to 0.22, and water saturation is 0.5 when precipitation takes place.

Figure 10:
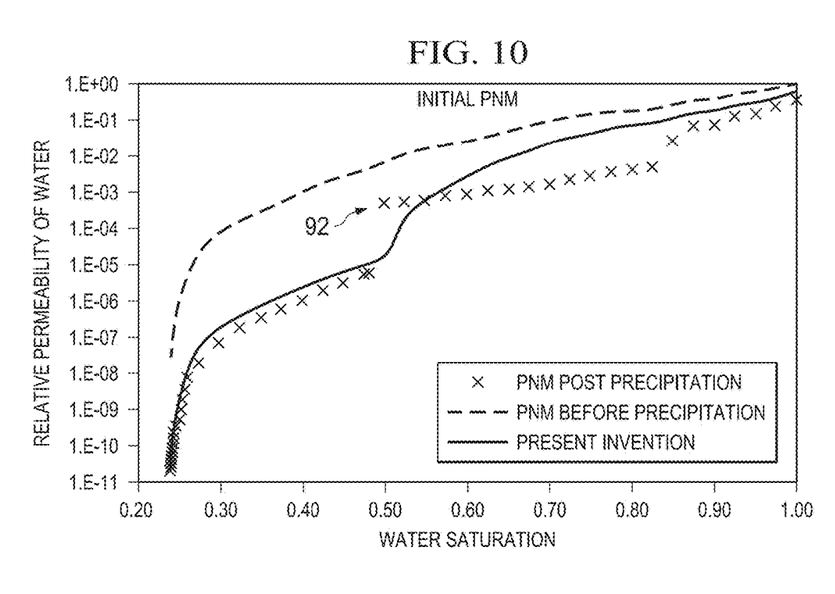
FIG. 10 is a comparative plot of change of water relative permeability before and after precipitation determined from a pore network modeling of a porous formation rock sample, and from the present invention for the same sample.
Figure 11:
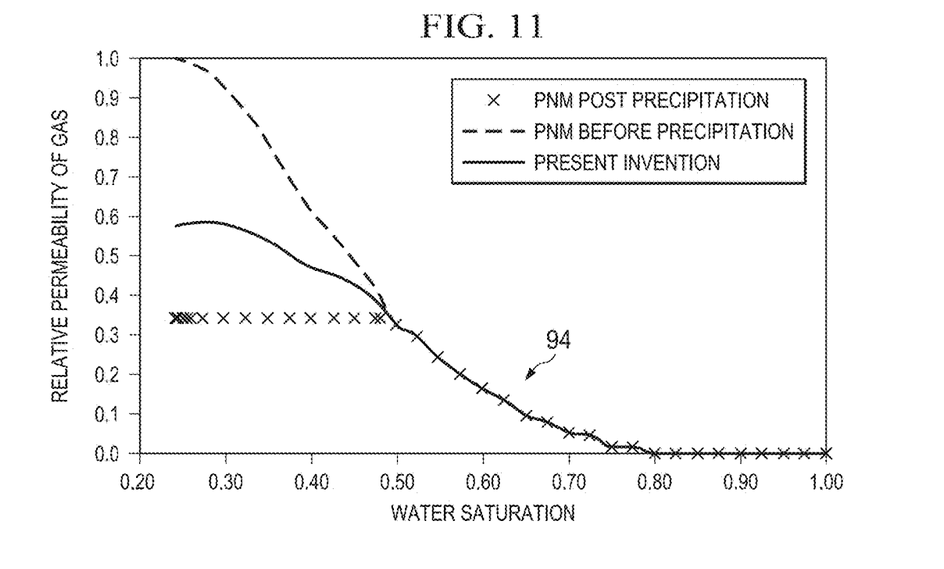
FIG. 11 is a comparative plot of change of oil relative permeability before and after precipitation determined from a pore network modeling of a porous formation rock sample, and from the present invention for the same sample.
Figure 12:
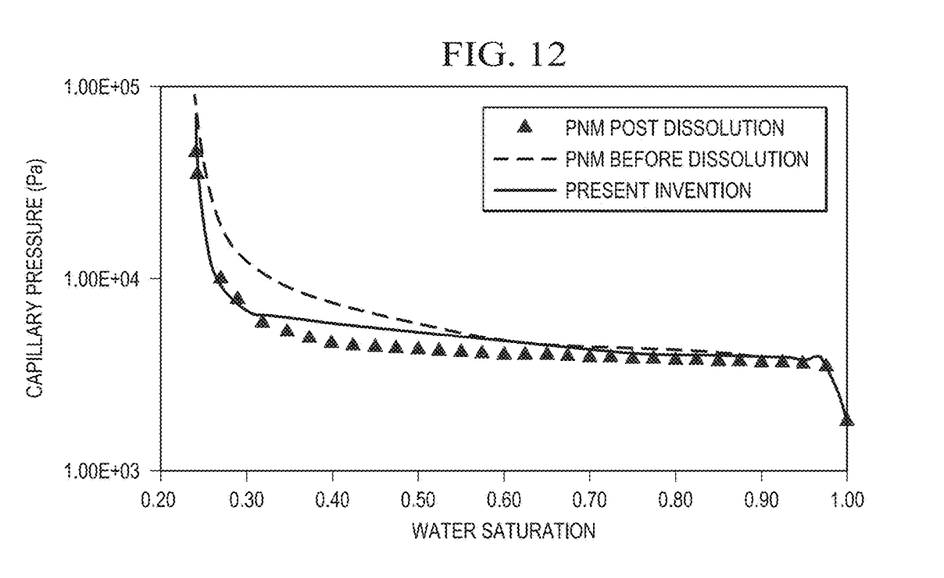
FIG. 12 is a comparative plot of change of capillary pressure before and after dissolution determined from a pore network modeling of a porous formation rock sample, and from the present invention for the same sample.
Figure 13:
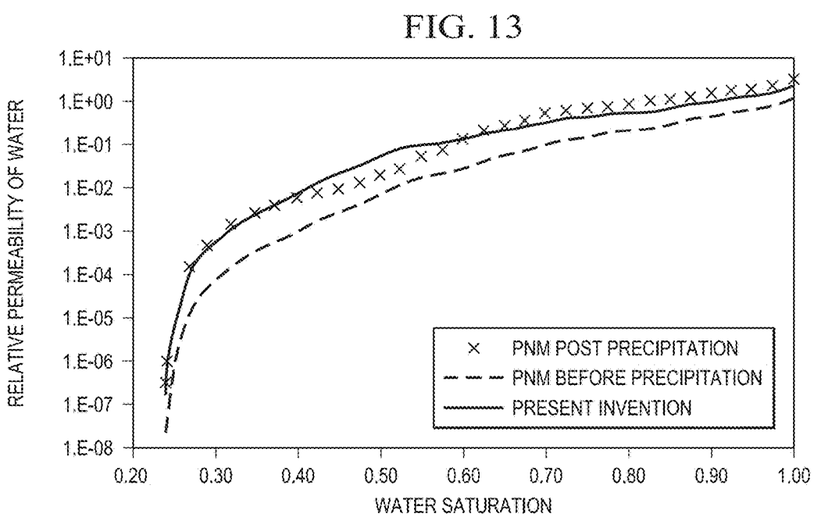
FIG. 13 is a comparative plot of change of water relative permeability before and after dissolution determined from a pore network modeling of a porous formation rock sample, and from the present invention for the same sample.
Figure 14:
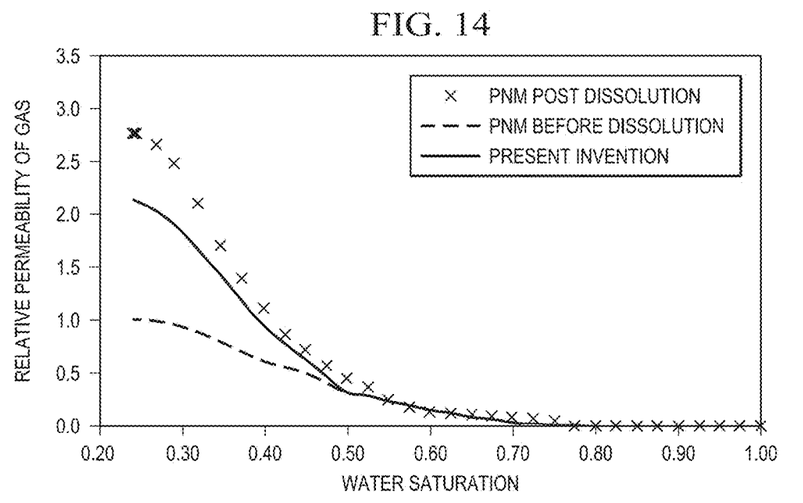
FIG. 14 is a comparative plot of change of oil relative permeability after dissolution determined from a pore network modeling of a porous formation rock sample, and from the present invention for the same sample.

FIGS. 10 and 11 are example plots of relative permeability of water ($K_{rw}$) and oil ($K_{ro}$), respectively, as functions of water saturation $S_w$ where there is precipitation. FIG. 12 is an example plot of capillary pressure ($P_a$) as a function of water saturation $S_w$ where dissolution is occurring, while FIGS. 13 and 14 are example plots of relative permeability of water ($K_{rw}$) and oil ($K_{ro}$), respectively a function of water saturation $S_w$ where there is dissolution.

The dashed lines in each of FIGS. 9 through 14, are the initial capillary pressure or relative permeability of water and oil. The solid lines are predictions from the present invention presented in Equations (6), (7) and (8). The triangles in each of these Figures are determined results from pore network modeling. The results from pore network calculations can be seen to be fitted with those determined according to the present invention quite satisfactorily.

In FIG. 9, capillary pressure is increased by a factor of 1/δ for water saturation smaller than 50%, while kept unchanged for water saturation larger than that. Thus, there is an offset at $S_w$=50% as indicated at 90, which is well captured by the methodology of the present invention and the pore network calculation. In FIG. 10, the relative permeability of water is decreased by a factor of 1/δ for $S_w$<50%. Again, there is at 92, an offset at $S_w$=50%, and the change of relative permeability is less substantial for $S_w$>50%. As shown in FIG. 11 at 94. the relative permeability of gas is unchanged for $S_w$>50%, and decreases for $S_w$<50%. In FIGS. 12 through 14, the capillary pressure decreases, and relative permeability increase in the dissolution case, and the results from pore network models are well captured by the methodology of the present invention.

In summary, the comparisons described above in connection with FIGS. 9 through 14 obtained by the methodology of the present invention indicate that the proposed continuum-scale relations so developed satisfactorily predict the pore-scale modeling results. The present invention can be seen to allow for calculations of new permeability, capillary pressure and relative permeabilities in reservoir simulators after mineral reactions. The present invention provides parameters that describe pore size distribution (m), the fraction of pore space where precipitation happens (Sp), and the amount of precipitation/dissolution (δ). The related parameters are either model input (m) or intermediate modeling results (such as Sp, δ) also used for calculating two-phase flow, so no new parameters need to be defined in reservoir simulators or reactive transport codes.

Determining Petrophysical Properties and their Interrelation

The pore space of a porous medium is conceptualized as cylindrical capillaries with a continuous distribution of radii r. A given capillary can be either water-filled or completely dry, depending on the saturation state of the medium. With this geometric idealization, the capillary pressure-water saturation curve can be interpreted to represent continuous cumulative pore-size distributions (PSD). In a given portion of the porous medium (in computational terms this would be a cell within the modeled domain), at any time the water content is known. Due to precipitation/dissolution, the pore volume will change and thus the capillary pressure curve changes also. The maximum radius up to which pores are water-filled and therefore affected by mineral reactions can be determined from the capillary pressure curve.

Before mineral dissolution/precipitation, the relative permeability parameter $k_r$ can be expressed according to Mualem, Y., 1976, "A New Model for Predicting the Hydraulic Conductivity of Unsaturated Porous Media Water Resources Research 12," pp. 513-522.

$$k_r = S^{\frac{1}{2}} \left\{ \frac{\int_0^S \left(\frac{1}{h(x)}\right) dx}{\int_0^1 \left(\frac{1}{h(x)}\right) dx} \right\}^2 \tag{10}$$

where h is the capillary pressure head, given as a function of effective wetting-phase saturation, $$S = \frac{\theta - \theta_r}{\theta_s - \theta_r} \tag{11}$$

where θ is wetting-phase content (the ratio of wetting-phase volume to the corresponding bulk volume of a porous medium), and subscripts s and r refer to saturated and residual values for θ.

The saturation can be related to pressure head by the previously cited van Genuchten article as:

$$S = [1+(\alpha h)^n]^{-m} \tag{12}$$

where α, n and m=1−1/n are empirical parameters.

Using Equation (10) and Equation (12), relative permeability as a function of saturation S can be expressed as:

$$k_r(S) = S^{\frac{1}{2}}\left[1-\left(1-S^{\frac{1}{m}}\right)^m\right]^2 \tag{13}$$

The ratio of pore volume after chemical reactions to that when reaction just starts, β, is defined with the present invention as:

$$\beta = \frac{\theta_p - \theta_{reaction}}{\theta_p} = 1 - \frac{\theta_{reaction}}{\theta_p} \tag{14}$$

For simplicity, the present invention approximates the ratio of the hydraulic radius (for a pore after precipitation) to its original radius to be a power function of the corresponding volume ratio.

$$\delta = \beta^\chi \tag{15}$$

where χ is an empirical parameter equal to 4.5, as described. From the petrophysical properties determined in the foregoing manner, the present invention permits determination of further petrophysical properties, as described below.

Capillary Pressure

The hydraulic radius is changed from r to δr for $S \leq S_p$, while maintained unchanged for $S > S_p$, where $S_p$ is the water saturation when mineral precipitates. Since capillary pressure is proportional to 1/r, the new capillary pressure is:

$$h = \frac{h_0}{\delta}, \text{ when } S \leq S_p \tag{16}$$

$$h = h_0 \text{ when } S > S_p$$

where $h_0$ is the initial capillary pressure at saturation S. This means that capillary pressure is increased by a factor of 1/δ for $S \leq S_p$, while maintains unchanged for $S > S_p$. It is noted that the new h-S curve is not continuous at $S=S_p$. This is essentially because of the fact that mineral precipitation only happens in the water phase where $S \leq S_p$.

In the case of dissolution, the sizes of the small pores initially occupied by water increase, and become larger than the previously large pores. Thus the pores need to be rearranged in term of pore sizes in order to determine the new capillary pressure curve. The two threshold saturations between which pore sizes need to be rearranged in the new capillary curve are:

$$S_1 = \left[1+\left(\frac{\alpha h_p}{\delta}\right)^n\right]^{-m}$$

$$S_2 = [1+(\alpha h_p \delta)^n]^{-m}$$

where $h_p = h_0(S_p)$

The new capillary pressure curve is $$S=[1+(\alpha h \delta)^n]^{-n}, \text{ when } 0 \leq S < S_1 \tag{17}$$

$$S=[1+(\alpha h \delta)^n]^{-m}+[1+(\alpha h)^n]^{-m}-S_p, \text{ when } S_1 \leq S < S_2$$

$$S=[1+(\alpha h)^n]^{-m}, \text{ when } S_2 \leq S \leq 1$$

Total Permeability

Considering that precipitation occupies pore spaces filled by water, the new permeability after precipitation is $$\frac{K}{K_0} = S_p^{\frac{1}{2}} \left\{ \frac{\int_0^{S_p}\left(\frac{\delta\beta}{h(x)}\right)dx + \int_{S_p}^1\left(\frac{1}{h(x)}\right)dx}{\int_0^1\left(\frac{1}{h(x)}\right)dx} \right\}^2 \tag{18}$$

where $S_p$ is the saturation when precipitation happens.

Using the mathematical relation according to the van Genuchten method described above, f(S) representing the radius-weighted volume of water occupied pores is determined as:

$$f(S) = \frac{\int_0^S \left(\frac{1}{h(x)}\right)dx}{\int_0^1 \left(\frac{1}{h(x)}\right)dx} = 1 - \left(1 - S^{\frac{1}{m}}\right)^m$$

From this with the present invention it is possible to obtain $$\frac{K}{K_0} = \left[(\delta\beta - 1)\left\{1 - \left(1 - S_p^{\frac{1}{m}}\right)^m\right\} + 1\right]^2 \quad (19)$$

In the model of Liu et al. (2013), the tortuosity factor was modified to take into account the fact that precipitation in a fraction of pore space could impact the tortuosity factor corresponding to the term $S^{1/2}$.

$$\frac{K}{K_0} = \zeta^{\frac{1}{2}}\left[(\delta\beta - 1)\left\{1 - \left(1 - S_p^{\frac{1}{m}}\right)^m\right\} + 1\right]^2 \quad (20)$$

where $\zeta = 1 - S_p + \delta^2 S_p$. This is the relationship for permeability change owing to precipitation according to the present invention.

Relative Permeability of Water

When $S \leq S_p$ $$\frac{K_w}{K_0} = \zeta^{\frac{1}{2}}\left\{\frac{\int_0^S \left(\frac{\delta\beta}{h(x)}\right)dx}{\int_0^1 \left(\frac{1}{h(x)}\right)dx}\right\}^2$$

where $\zeta = \delta^2 S$ for $K_w$ $$\frac{K_{w0}}{K_0} = \zeta^{\frac{1}{2}}\left\{\frac{\int_0^S \left(\frac{1}{h(x)}\right)dx}{\int_0^1 \left(\frac{1}{h(x)}\right)dx}\right\}^2$$

where $\zeta = S$ for $K_{w0}$ $K_{w0}$ and $K_0$ are the initial water permeability and total permeability before mineral alteration. [alteration?] Thus $$\frac{K_w}{K_0} = \delta^3\beta^2 \frac{K_{w0}}{K_0}, \text{ when } S \leq S_p \quad (21)$$

When $S > S_p$, $$\frac{K_w}{K_0} = \zeta^{\frac{1}{2}}\left\{\frac{\int_0^{S_p}\left(\frac{\delta\beta}{h(x)}\right)dx + \int_{S_p}^S\left(\frac{1}{h(x)}\right)dx}{\int_0^1\left(\frac{1}{h(x)}\right)dx}\right\}^2 =$$

$$(S - S_p + \delta^2 S_p)^{1/2}[f(S) + (\delta\beta - 1)f(S_p)]^2$$

$$\frac{K_{w0}}{K_0} = \zeta^{1/2}\left\{\frac{\int_0^{S_p}\left(\frac{1}{h(x)}\right)dx + \int_{S_p}^S\left(\frac{1}{h(x)}\right)dx}{\int_0^1\left(\frac{1}{h(x)}\right)dx}\right\}^2 = S^{1/2}[f(S)]^2$$

Thus, $$\frac{K_w}{K_0} = \left(\frac{S - S_p + \delta^2 S_p}{S}\right)^{\frac{1}{2}}\left[\frac{f(S) + (\delta\beta - 1)f(S_p)}{f(S)}\right]^2 \frac{K_{w0}}{K_0}, \quad (22)$$

when $S > S_p$ where $$f(S) = \frac{\int_0^S \left(\frac{1}{h(x)}\right)dx}{\int_0^1 \left(\frac{1}{h(x)}\right)dx} = 1 - \left(1 - S^{\frac{1}{m}}\right)^m$$

Here, the tortuosity factor is $\zeta = S - S_p + \delta^2 S_p$ for $K_w$ $\zeta = S$ for $K_{w0}$ This is the relationship for permeability change owing to precipitation according to the present invention.

In the case of dissolution, the present invention has when $0 \leq S < S_1$:

$$\frac{K_w}{K_0} = \delta^3 \beta^2 \frac{K_{w0}}{K_0} \quad (23)$$

when $S_1 \leq S < S_p$:

$$\frac{K_w}{K_0} = \zeta^{\frac{1}{2}}\left\{\frac{\int_\infty^{h_1}\left(\frac{\delta\beta}{h}\right)S'dh + \int_{h_1}^h\left(\frac{(\delta+1)\beta}{h}\right)S'dh}{\int_0^1 \left(\frac{1}{h(x)}\right)S'dh}\right\}^2 =$$

$$(\delta^2 S)^{\frac{1}{2}}[(\delta\beta + \beta)f(h) - \beta f(h_1)]^2$$

Thus, $$\frac{K_w}{K_0} = \delta\left[\frac{(\delta\beta + \beta)f(h) - \beta f(h_1)}{f(h)}\right]^2 \frac{K_{w0}}{K_0} \quad (24)$$

when $S_p \leq S < S_2$:

$$\frac{K_w}{K_0} = \left(\frac{S - S_p + \delta^2 S_p}{S}\right)^{\frac{1}{2}}\left[\frac{(\delta\beta + \beta)f(h) - \beta f(h_1)}{f(h)}\right]^2 \frac{K_{w0}}{K_0} \quad (25)$$

when $S_2 \leq S \leq 1$:

$$\frac{K_w}{K_0} = \zeta^{\frac{1}{2}} \left\{ \frac{\int_\infty^{h_1} \left(\frac{\delta\beta}{h}\right) S' dh + \int_{h_1}^{h} \left(\frac{(\delta+1)\beta}{h}\right) S' dh + \int_{h_2}^{0} \left(\frac{1}{h}\right) S' dh}{\int_0^1 \left(\frac{1}{h(x)}\right) S' dh} \right\}^2$$

$$= (S - S_p + \delta^2 S_p)^{\frac{1}{2}} [f(h) - \beta f(h_1) + (\delta\beta + \beta - 1) f(h_2)]^2$$

Thus, $$\frac{K_w}{K_0} = \left(\frac{S - S_p + \delta^2 S_p}{S}\right)^{1/2} \left[\frac{f(h) - \beta f(h_1) + (\delta\beta + \beta - 1) f(h_2)}{f(h)}\right]^2 \frac{K_{w0}}{K_0} \quad (26)$$

In practice, the relative permeability change in the dissolution case can be approximated using the same equations as in the precipitation case. Results show that the approximation is satisfactory (FIG. 13).

Relative Permeability of Gas

When $S > S_p$ $$\frac{K_g}{K_0} = \frac{K_{g0}}{K_0}$$

$K_{g0}$ and $K_0$ are the initial gas permeability and total permeability before mineral alteration.

When $S \leq S_p$ $$\frac{K_g}{K_0} = \zeta^{\frac{1}{2}} \left\{ \frac{\int_S^{S_p} \left(\frac{\delta\beta}{h(x)}\right) dx + \int_{S_p}^{1} \left(\frac{1}{h(x)}\right) dx}{\int_0^1 \left(\frac{1}{h(x)}\right) dx} \right\}^2$$

$$= [(S_p - S)\delta^2 + (1 - S_p)]^{\frac{1}{2}} [1 - \delta\beta f(S) + (\delta\beta - 1) f(S_p)]^2$$

$$\frac{K_{g0}}{K_0} = \zeta^{\frac{1}{2}} \left\{ \frac{\int_S^1 \left(\frac{1}{h(x)}\right) dx}{\int_0^1 \left(\frac{1}{h(x)}\right) dx} \right\}^2 = (1 - S)^{\frac{1}{2}} [1 - f(S)]^2$$

Thus, $$\frac{K_g}{K_0} = \left[\frac{(S_p - S)\delta^2 + (1 - S_p)}{1 - S}\right]^{\frac{1}{2}} \left[\frac{1 - \delta\beta f(S) + (\delta\beta - 1) f(S_p)}{1 - f(S)}\right]^2 \frac{K_{g0}}{K_0}, \quad (27)$$

when $S \leq S_p$

This is the relationship between relative permeability of the non-wetting phase and precipitation according to the present invention.

In the case of dissolution, the relative permeability change of gas can also be approximated using the same equations as in the precipitation case. Again, results show that the approximation is satisfactory (FIG. 14).

Pore network modeling was conducted on Berea sandstone to verify the new method. As described above, the modeling results are satisfactorily predicted and modeled by the methodology according to the present invention. The present invention allows for significant enhancement of accuracy in reservoir simulation and reactive transport modeling. Potential applications of the methodology according to the present invention include predicting the impacts of CO2 injection on reservoir property evolution, the impacts of acidizing fluids on reservoir porosity and permeability (wormholes), the effects of water composition on oil recovery efficiency using 'smart water', and pre-drill prediction of reservoir quality.

The present invention thus can be seen to provide a continuum-scale method to describe effects of mineral precipitation and dissolution on multiphase flow properties (capillary pressure and relative permeabilities) in porous media. Specifically, the methodology provides a capability to determine and model changes of capillary pressure, permeability and relative permeabilities in reservoir simulators due to mineral precipitation or dissolution in a multiphase flow system. The related parameters are either model input or intermediate modeling results for calculating multiphase flow in reservoir simulators, so there is no need to define new parameters in reservoir simulators or reactive transport codes.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

What is claimed is:

1. A computer implemented method of determining a model of capillary pressure and relative permeability changes in pores of formation rock of a subsurface earth formation occupied by a water phase of multiphase fluid comprising water and a petroleum fluid mixture during reservoir simulation of fluid production of the multiphase fluid from the reservoir by a computerized reservoir simulator, the capillary pressure and relative permeability changes being due to mineral reactions in water phase occupied pores of the formation rock as a result of the multiphase fluid flow in the formation during production from the reservoir, the model being based on measures of initial capillary pressure and relative permeability of the formation rock at a time step during the reservoir simulation, the method comprising the computer implemented steps of:

a) forming a measure of initial pore size distribution and pore volume of the formation rock based on the measures of initial capillary pressure and relative permeability of the formation rock;

b) monitoring water saturation measures of the formation rock determined in the reservoir simulation for a water saturation value Sp at which mineral reactions occur in the formation rock as a result of the multiphase fluid flow in the formation during production from the reservoir;

c) determining a ratio of pore volume after mineral reactions occur to the initial pore volume of the formation rock as a result of the multiphase fluid flow in the formation during production from the reservoir;

d) determining a modified measure of rock permeability after mineral reactions of the formation rock as a result of the multiphase fluid flow in the formation during production from the reservoir;

e) determining a modified measure of capillary pressure of the formation rock after mineral reactions of the formation rock as a result of the multiphase fluid flow in the formation during production from the reservoir;

f) determining a modified measure of rock relative permeabilities after mineral reactions of the formation rock as a result of the multiphase fluid flow in the formation during production from the reservoir;

g) transferring the determined modified measures of rock permeability, relative permeabilities, and capillary pressure of the formation rock as a result of the multiphase fluid flow in the formation during production from the reservoir to the reservoir simulator; and h) incrementing to a new time step of the reservoir simulation for simulation of fluid production from the reservoir based on the determined modified measures of rock permeability, relative permeabilities, and capillary pressure of the formation rock.

2. The computer implemented method of claim 1, wherein the mineral reaction is precipitation in the pores of the formation rock as a result of the multiphase fluid flow in the formation during production from the reservoir.

3. The computer implemented method of claim 1, wherein the mineral reaction is dissolution of the formation rock as a result of the multiphase fluid flow in the formation during production from the reservoir.

4. A data processing system determining a model of capillary pressure and relative permeability changes in pores of formation rock of a subsurface earth formation occupied by a water phase of multiphase fluid comprising water and a petroleum fluid mixture during reservoir simulation of fluid production of the multiphase fluid from the reservoir by a computerized reservoir simulator, the capillary pressure and relative permeability changes being due to mineral reactions in water phase occupied pores of the formation rock as a result of the multiphase fluid flow in the formation during production from the reservoir, the model being based on measures of initial capillary pressure and relative permeability of the formation rock at a time step during the reservoir simulation, the data proceeding system comprising:

a) a memory storing the measures of initial capillary pressure and relative permeability of the formation rock;

b) a processor performing the steps of:

(1) forming a measure of initial pore size distribution and pore volume of the formation rock based on the measures of initial capillary pressure and relative permeability of the formation rock;

(2) monitoring water saturation measures of the formation rock determined in the reservoir simulation for a water saturation value Sp at which mineral reactions occur in the formation rock as a result of the multiphase fluid flow in the formation during production from the reservoir;

(3) determining a ratio of pore volume after mineral reactions occur to the initial pore volume of the formation rock as a result of the multiphase fluid flow in the formation during production from the reservoir;

(4) determining a modified measure of rock permeability after mineral reactions of the formation rock as a result of the multiphase fluid flow in the formation during production from the reservoir;

(5) determining a modified measure of rock relative permeabilities after mineral reactions of the formation rock as a result of the multiphase fluid flow in the formation during production from the reservoir;

(6) determining a modified measure of capillary pressure of the formation rock after mineral reactions of the formation rock as a result of the multiphase fluid flow in the formation during production from the reservoir;

(7) transferring the determined modified measures of rock permeability, relative permeabilities and capillary pressure of the of the formation rock as a result of the multiphase fluid flow in the formation during production from the reservoir to the reservoir simulator; and (8) incrementing to a new time step of the reservoir simulation for simulation of fluid production from the reservoir based on the determined modified measures of rock permeability, relative permeabilities, and capillary pressure of the formation rock.

5. The data processing system of claim 4, wherein the mineral reaction is precipitation in the pores of the formation rock as a result of the multiphase fluid flow in the formation during production from the reservoir.

6. The data processing system of claim 4, wherein the mineral reaction is dissolution of the formation rock as a result of the multiphase fluid flow in the formation during production from the reservoir.

* * * * *